(12) United States Patent
Laurisch et al.

(10) Patent No.: US 10,201,068 B2
(45) Date of Patent: Feb. 5, 2019

(54) METHOD FOR THE PLASMA CUTTING OF WORKPIECES

(71) Applicant: Kjellberg-Stiftung, Gießen (Deutschland) (DE)

(72) Inventors: Frank Laurisch, Finsterwalde (DE); Volker Krink, Finsterwalde (DE)

(73) Assignee: KJELLBERG-STIFTUNG, Giessen (DE)

( * ) Notice: Subject to any disclaimer, the term of this patent is extended or adjusted under 35 U.S.C. 154(b) by 577 days.

(21) Appl. No.: 14/081,155

(22) Filed: Nov. 15, 2013

(65) Prior Publication Data
US 2014/0144891 A1 May 29, 2014

(30) Foreign Application Priority Data

Nov. 16, 2012 (EP) .................................... 12193030

(51) Int. Cl.
*B23K 10/00* (2006.01)
*H05H 1/34* (2006.01)
*B23K 9/013* (2006.01)

(52) U.S. Cl.
CPC .............. *H05H 1/34* (2013.01); *B23K 9/013* (2013.01); *B23K 10/00* (2013.01); *B23K 10/006* (2013.01)

(58) Field of Classification Search
CPC .......... H05H 1/34; C03B 5/005; B23K 10/00; B23K 10/006; B23K 9/013
(Continued)

(56) References Cited

U.S. PATENT DOCUMENTS

| 4,187,409 A | * | 2/1980 | Slater | ..................... B23K 10/00 219/121.39 |
| 4,415,795 A | * | 11/1983 | Ross | ..................... B23K 9/287 219/121.44 |

(Continued)

FOREIGN PATENT DOCUMENTS

| JP | 54002245 A | 1/1979 |
| JP | 2003136247 A | 5/2003 |

(Continued)

OTHER PUBLICATIONS

Plasma Saber uses water to cut through steel. YouTube [online]. Uploaded on Mar. 14, 2009 [retrieved on Apr. 15, 2016]. Retrieved from the Internet: <URL: https://www.youtube.com/watch?v=9aJfXI7frdQ>.*

(Continued)

*Primary Examiner* — Jimmy Chou
(74) *Attorney, Agent, or Firm* — Jacobson Holman, PLLC.

(57) ABSTRACT

The invention relates to a method for the plasma cutting of workpieces. It is the object of the invention to provide possibilities with which improved cutting surfaces can be achieved in plasma cutting which do not require any reworking, or at least only a reduced reworking. In the method in accordance with the invention, a plasma cutting torch having at least one torch body, an electrode and a nozzle is used and the plasma jet is inclined or deflected at least before the traveling over of a workpiece edge at an angle δ with respect to the axis aligned perpendicular to the workpiece surface such that the emission position of the plasma jet from the workpiece is arranged at a spacing in the feed movement direction which is at most half the amount than is the case with a plasma jet incident perpendicular on the workpiece surface.

16 Claims, 12 Drawing Sheets

(58) Field of Classification Search
USPC .......... 219/121.36, 121.38, 121.39, 121.44, 219/121.56, 121.59
See application file for complete search history.

(56) References Cited

U.S. PATENT DOCUMENTS

| | | | | |
|---|---|---|---|---|
| 4,767,102 A * | 8/1988 | Dube | ................ | B23K 10/00 266/48 |
| 5,162,632 A * | 11/1992 | Carkhuff | ................ | B23K 10/00 219/121.48 |
| 5,489,820 A * | 2/1996 | Ivanov | ................ | H05H 1/0025 315/111.21 |
| 5,695,663 A * | 12/1997 | Shintani | ................ | B23K 10/00 219/121.39 |
| 5,767,627 A * | 6/1998 | Siniaguine | ................ | H05H 1/44 219/121.36 |
| 5,866,872 A * | 2/1999 | Lu | ................ | B23K 10/006 219/121.54 |
| 6,040,548 A * | 3/2000 | Siniaguine | ................ | H05H 1/40 219/121.36 |
| 6,201,207 B1 * | 3/2001 | Maruyama | ................ | B23K 7/102 219/121.39 |
| 6,333,487 B1 * | 12/2001 | Maruyama | ................ | B23K 7/102 219/121.78 |
| 6,359,251 B1 * | 3/2002 | Picard | ................ | B23K 10/00 219/121.39 |
| 6,423,923 B1 * | 7/2002 | Siniaguine | ................ | H05H 1/44 219/121.5 |
| 6,469,274 B1 * | 10/2002 | Delzenne | ................ | B23K 10/00 219/121.39 |
| 6,705,921 B1 * | 3/2004 | Shepherd | ................ | B24C 1/045 408/180 |
| 6,772,040 B1 * | 8/2004 | Picard | ................ | H05H 1/36 219/121.11 |
| 7,074,112 B2 * | 7/2006 | Olsen | ................ | B24C 1/045 409/201 |
| 7,087,855 B2 * | 8/2006 | Yamaguchi | ................ | B23K 10/006 219/121.39 |
| 8,097,204 B2 * | 1/2012 | Flaig | ................ | B23K 7/001 266/48 |
| 8,378,250 B2 * | 2/2013 | Flaig | ................ | B23K 7/001 219/121.39 |
| 8,525,067 B2 * | 9/2013 | Muscat-Tyler | ................ | B23K 10/00 219/121.39 |
| 8,754,349 B2 * | 6/2014 | Phillip | ................ | B23K 10/00 219/121.44 |
| 8,946,583 B2 * | 2/2015 | Riemann | ................ | B23K 10/00 219/121.39 |
| 8,946,584 B2 * | 2/2015 | Riemann | ................ | B23K 10/00 219/121.39 |
| 9,108,711 B2 * | 8/2015 | Krueger | ................ | B63H 25/46 |
| 9,296,061 B2 * | 3/2016 | Pikus | ................ | B23K 10/02 |
| 2001/0019041 A1 * | 9/2001 | Augeraud | ................ | B23K 10/00 219/121.39 |
| 2004/0112875 A1 * | 6/2004 | Yamaguchi | ................ | B23K 10/006 219/121.39 |
| 2005/0077271 A1 * | 4/2005 | Delzenne | ................ | B23K 10/006 219/121.44 |
| 2008/0302767 A1 * | 12/2008 | Yamaguchi | ................ | B23K 10/00 219/121.44 |
| 2009/0250445 A1 * | 10/2009 | Yamaguchi | ................ | B23K 10/006 219/121.72 |
| 2010/0155376 A1 * | 6/2010 | Lindsay | ................ | B23K 10/00 219/121.44 |
| 2010/0155377 A1 * | 6/2010 | Lindsay | ................ | B23K 31/10 219/121.44 |
| 2010/0176096 A1 * | 7/2010 | Koike | ................ | B23K 10/00 219/121.44 |
| 2010/0301020 A1 * | 12/2010 | Phillip | ................ | B23K 10/00 219/121.44 |
| 2011/0109022 A1 * | 5/2011 | Flaig | ................ | B23K 7/001 266/77 |
| 2011/0210100 A1 * | 9/2011 | Smallwood | ................ | B23K 10/00 219/121.44 |
| 2011/0290767 A1 * | 12/2011 | Muscat-Tyler | ................ | B23K 10/00 219/121.44 |
| 2012/0103947 A1 * | 5/2012 | Flaig | ................ | B23K 7/001 219/121.44 |
| 2012/0199562 A1 * | 8/2012 | Friedel | ................ | B23K 10/006 219/121.44 |
| 2012/0298632 A1 * | 11/2012 | Riemann | ................ | B23K 10/00 219/121.44 |
| 2014/0263206 A1 * | 9/2014 | Blevins | ................ | B23K 10/006 219/121.56 |

FOREIGN PATENT DOCUMENTS

| | | |
|---|---|---|
| JP | 2003136247 A | 5/2003 |
| JP | 2001234633 A | 8/2010 |
| KR | 20050018027 A | 2/2005 |
| WO | WO2007016921 A1 | 2/2007 |

OTHER PUBLICATIONS

Miller Plasma Cutting Tips Part 1. YouTube [online]. Uploaded on May 25, 2010 [retrieved on Apr. 15, 2016]. Retrieved from the Internet: <URL: https://www.youtube.com/watch?v=J7hljnzJBnA>.*

KOIKE Plasma Cutting Machine. YouTube [online]. Uploaded on Nov. 28, 2010 [retrieved on Apr. 18, 2016]. Retrieved from the Internet: <URL: https://www.youtube.com/watch?v=TnMsDOeyjXw>.*

PlasmaCam—CNC Plasma Cutter Demonstration. YouTube [Online]. Uploaded on Apr. 2, 2012 [retrieved on Sep. 8, 2016]. Retrieved from the internet: <https://www.youtube.com/watch?v=STwvQOcV4MY>.*

AKS Plasma Bevel Cutting—Part 1 [online]. YouTube, 2011 [retrieved on Nov. 14, 2017]. Retrieved from the Internet: <URL: https://www.youtube.com/watch?v=zJ4TP0ahhto>.*

Welcome to Koike's 3D Bevel Cutting Informational Video [online]. YouTube , 2011 [retrieved on Nov. 14, 2017]. Retrieved from the Internet: <URL: https://www.youtube.com/watch?v=9r8KaUwwEpg>.*

European Search Report issued in EP Application No. 12193030, completed Apr. 29, 2013, 16 pages (with English translation at the end).

* cited by examiner

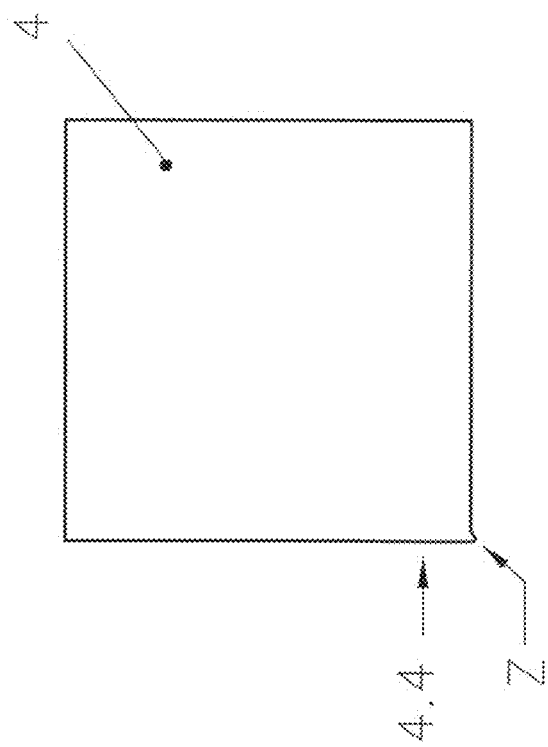

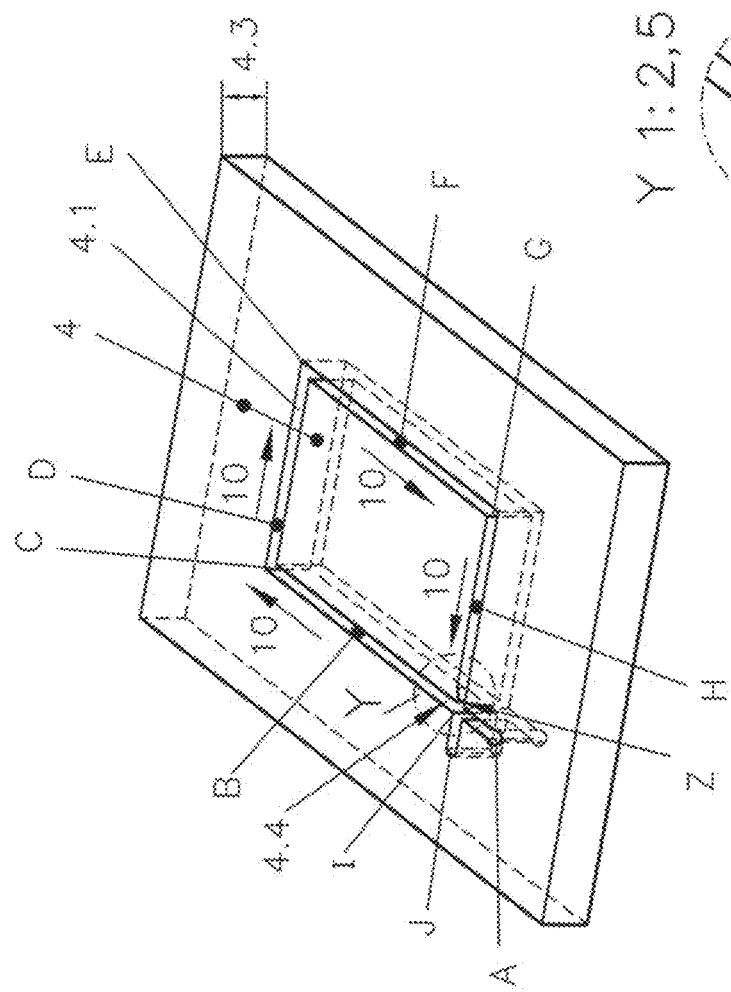
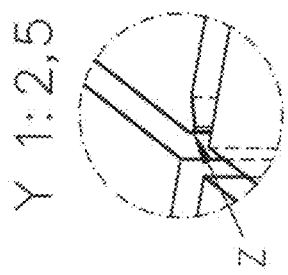
Fig. 4A
Fig. 4B

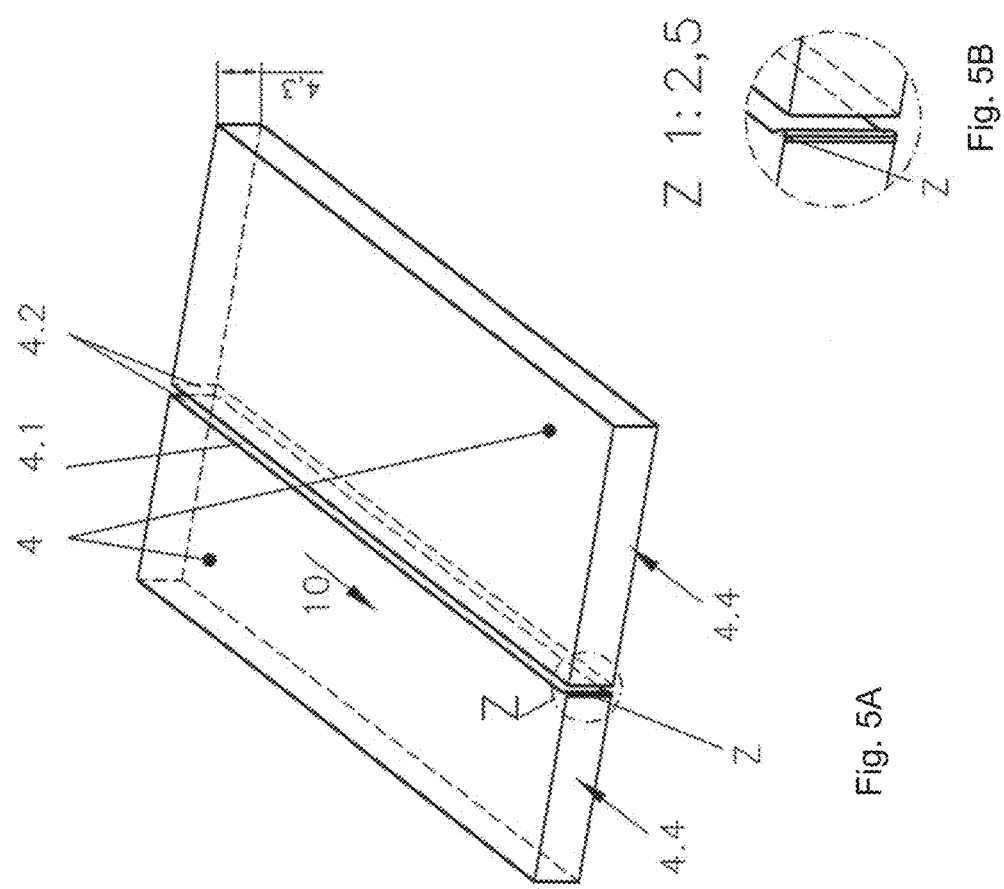

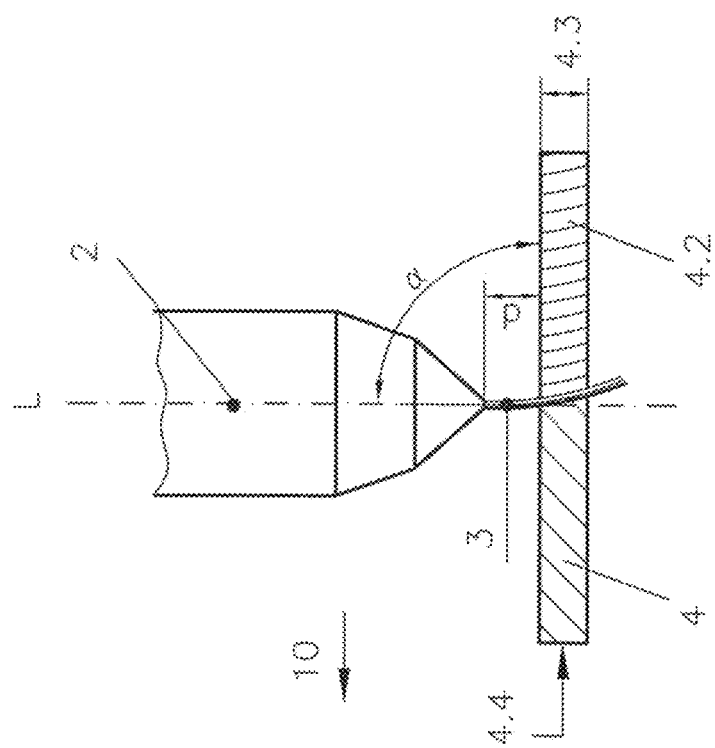

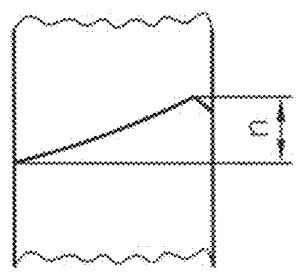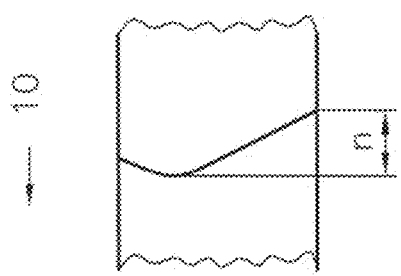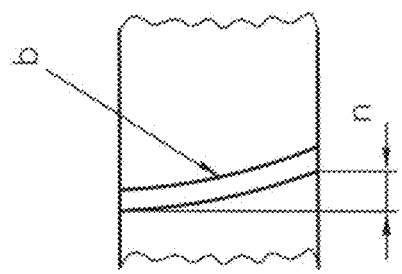

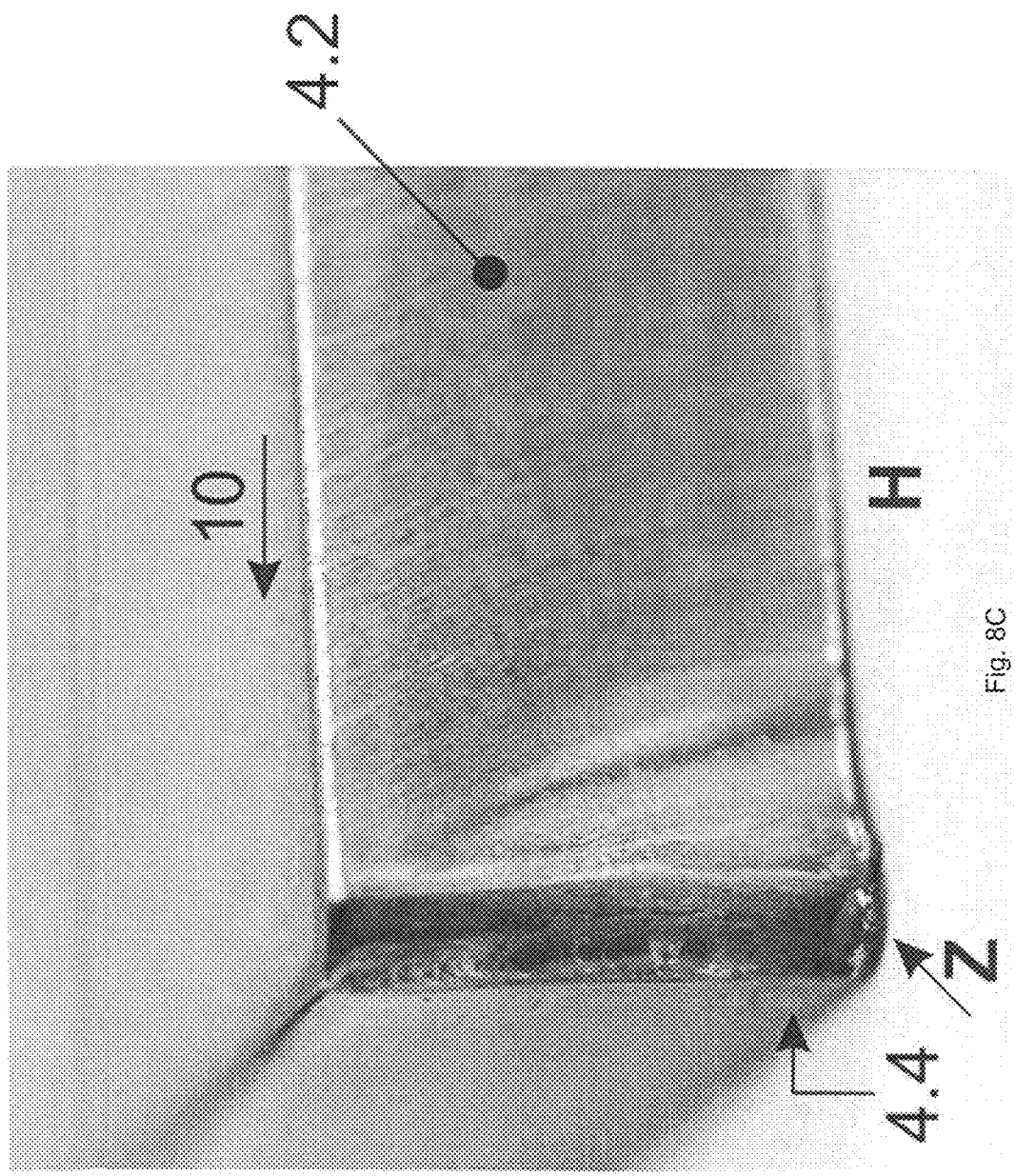

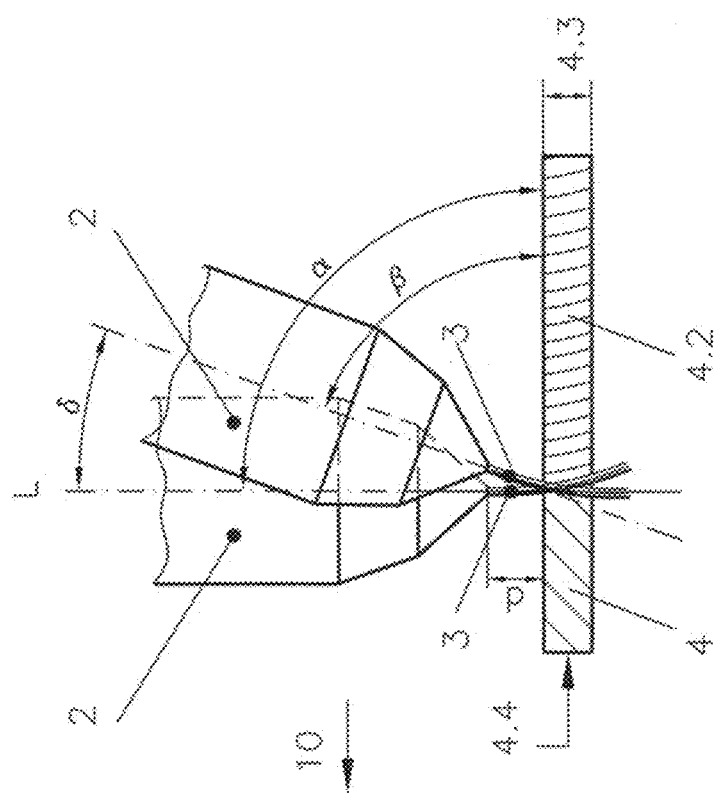

METHOD FOR THE PLASMA CUTTING OF WORKPIECES

CROSS-REFERENCE TO RELATED APPLICATION

This application claims priority to European Application No. 12193030.9, filed Nov. 16, 2012, which is incorporated herein by reference in its entirety.

TECHNICAL FIELD

The invention relates to a method for the plasma cutting of workpieces.

BACKGROUND

A plasma is a thermally highly heated electrically conductive gas which is composed of positive and negative ions, electrons and excited and neutral atoms and molecules.

Various gases, e.g. monatomic argon and/or the diatomic gases hydrogen, nitrogen, oxygen or air are used as a plasma gas. These gases ionize and dissociate by the energy of the plasma arc.

The parameters of the plasma jet can be highly influenced by the design of the nozzle and of the electrode. These parameters of the plasma jet are e.g. the jet diameter, the temperature, the energy density and the flow speed of the gas.

In plasma cutting, the plasma is usually constricted by a nozzle which may be gas-cooled or water-cooled. For this purpose, the nozzle has a nozzle bore through which the plasma jet flows. Energy densities up to $2\times10^6$ W/cm2 can thereby be achieved. Temperatures arise in the plasma jet of up to 30,000° C. which allow very high cutting speeds at all electrically conductive materials in combination with the high flow speed of the gas.

Plasma cutting is today an established process for cutting electrically conductive materials, with different gases and gas mixtures being used in dependence on the cutting work.

SUMMARY

An arrangement for plasma cutting is shown in FIG. 1. In this respect, the electrical cutting current flows from the current source 1 to the plasma cutting torch 2 via its electrode 2.1, the plasma jet 3 constricted by the nozzle 2.2 and the nozzle bore 2.2.1 to the workpiece 4 and then back to the current source 1.

The plasma cutting torch 2 substantially comprises the plasma torch head having a jet production system comprising the electrode 2.1, the nozzle 2.2 of the gas supply 2.3 and the torch body which realizes the supply of the media (gas, cooling water and electrical current) and receives the jet production system. In addition, a secondary gas cap 2.4 can be attached around the nozzle 2.2 of the plasma cutting torch 2 for supplying a secondary medium, e.g. a gas. The electrode 2.1 of the plasma cutting torch 2 is an electrode 2.1 which does not melt off and which substantially comprises a high-temperature material such as tungsten, zirconium or hafnium and thereby has a very high service life. The electrode 2.1 frequently comprises two parts having mutually connected parts, the electrode holder 2.1.1 which is formed from material (e.g. copper, silver, alloys therefrom) having good electrical and thermal conductivity and a refractory emission insert 2.1.2 having small electronic emission work (hafnium, zirconium, tungsten). The nozzle 2.2 typically comprises copper and constricts the plasma jet 3. A gas guidance for the plasma gas can be arranged between the electrode 2.1 and the nozzle 2.2 and sets the plasma gas into rotation. The position of the plasma cutting torch 2, from which the plasma jet 3 is emitted from the nozzle 2.2 or from the secondary gas cap 2.4, is called a plasma torch tip.

A pilot arc which burns with a small electrical current (e.g. 10 A-30 A) and thus with a small power between the electrode 2.1 and the nozzle 2.2 is first ignited, e.g. by means of high electrical voltage which is produced by the high voltage ignition device 1.3, for the cutting process. The current of the pilot arc is limited by the electrical resistance 1.2. This low-energy pilot arc prepares the path between the plasma cutting torch 2 and the workpiece 4 for the cutting arc by partial ionization. If the pilot arc contacts the workpiece 4, the cutting arc is formed by the electrical potential difference between the nozzle 2.2 and the workpiece 4 generated by the electrical resistance 1.2. Said cutting arc then burns with a usually larger electrical current (e.g. 20 A-900 A) and thus also a greater performance between the electrode 2.1 and the workpiece 4. The switch contact 1.4 is opened and the nozzle 2.2 is switched free of potential from the current source 1.1. This mode of operation is also called a direct mode of operation. In this respect, the workpiece 4 is exposed to the thermal, kinetic and electrical effect of the plasma jet 3. The method is thereby very effective and metals up to large thicknesses, e.g. 180 mm, can be cut at 600 A cutting current with a cutting speed of 0.2 m/min.

For this purpose, the plasma cutting torch 2 is moved by a guide system relative to the workpiece or to its surface. It can e.g. be a robot or a CNC controlled guide machine. The control of the guide system (not shown) communicates with the arrangement in accordance with FIG. 1. In the simplest case, it starts and ends the operation of the plasma cutting torch 2. In accordance with the present prior art, however, a plurality of signals and information can be exchanged, e.g. on operating states and data.

In plasma cutting, high cutting qualities can be achieved. Criteria for these are, for example, a small tolerance for rectangularity and inclination in accordance with DIN ISO 9013. When observing the ideal cutting parameters, which include inter alia the electrical cutting current, the cutting speed, the spacing between the plasma cutting torch and the workpiece and the gas pressure, smooth cutting surfaces and burr-free edges can be achieved.

It is also important for the quality of the cut that the electrode 2.1, in particular its emission insert 2.1.2 and the nozzle 2.2, in particular its nozzle bore 2.2.1, lie on a common axis to obtain the same, or at least an only slightly different, tolerance for rectangularity and inclination at the different cutting edges in any direction of movement of the plasma cutting torch 2 relative to the workpiece.

Tolerances for rectangularity and inclination of classes 2 to 4 in accordance with DIN ISO 9013 are state of the art in plasma cutting. This corresponds to an angle of up to 3°.

FIG. 2 schematically shows the contour guidance of a plasma cutting torch 2 for cutting a contour from a workpiece 4 viewed from above onto the workpiece 4. A rectangle is to be cut here. In this respect, section A is the cut start. An incision is made into the workpiece 4 using the plasma jet 3 there. After the piercing, the feed movement direction marked by the arrow is taken into account in the feed of the plasma jet 3 in section B. Section C, which is a corner to be cut, follows on. For this purpose, the guide system has to brake the movement in section C and subsequently accelerate it again on a further movement in the direction of section D. It is frequently not a "sharp" corner which is traveled, but rather a small radius, e.g. 1 mm, so that the plasma cutting torch 2 does not have to stop on a sudden change of feed movement direction, as in the sharp corner, before a straight section D is again cut. The feed movement direction can thus be varied continuously and "gently". What is disadvantageous here is a light rounding which arises in the region of the corner of the section C of the cut workpiece 4. A sharp-edged corner is obtained when the plasma cutting torch 2 is guided as in the region of the corner in section E. As shown in FIG. 2, the plasma cutting torch 2 leaves the contour of the workpiece 4 to be cut here and is guided over the "waste part" in order then again to return with its feed movement to the contour of the workpiece 4 to be cut. This is also called a "traveled corner". The feed speed of the plasma cutting torch 2 can thus be kept constant on the feed movement along the contour to be cut of the workpiece 4 to be cut and does not have to be varied due to the required changes in feed movement direction. In this respect, the greater waste of material is disadvantageous which is particularly annoying when workpieces 4 to be cut out are to be arranged closely next to one another. After the cutting of the straight line in section F, the cutting of the corner in section G and the cutting of the straight line in section H, the plasma cutting torch 2 is first traveled over the workpiece edge 4.4 produced by the flat joint and then over the flat joint of section B. This region is marked by 1 here. The cutting process is then ended in section J. When traveling over the workpiece edge 4.4 and over the subsequent flat joint, a region Z is formed (FIG. 3) which projects from the other cutting surface of section H. The quality of the cut workpiece 4 is hereby substantially degraded and this point has to be reworked, e.g. by grinding.

FIG. 3 schematically shows the contour of the cut workpiece 4 which arises in a view from above in accordance with FIG. 2. The region projecting from the remaining cutting surface 4.2 is marked by Z.

FIG. 4A shows a perspective view of a cut workpiece 4 which was cut in a similar manner as in FIGS. 2 and 3. FIG. 4B shows a zoomed in perspective view of part of FIG. 4A. Only the corner in section E was cut differently, namely as the corners of sections C and G. The projecting region Z also arises here on the moving over of the workpiece edge 4.4.

FIG. 5A shows by way of example a perspective view of a straight-line section such as is carried out for cutting off or trimming workpieces 4. FIG. 5B shows a zoomed in perspective view of part of FIG. 5A. The workpiece edge 4.4 is here not formed by the flat joint as in contour cutting, but rather by the end of the workpiece 4. The projecting region Z also arises here on the moving over of the workpiece edge 4.4.

FIG. 6 shows how a plasma cutting torch 2 is positioned at the spacing d from the workpiece 4 and is guided. As a rule, the plasma cutting torch 2 is aligned perpendicular (α=90°) to the workpiece surface in order to achieve cutting surfaces which are as perpendicular as possible.

There are also apparatus which incline a plasma cutting torch in order directly to generate oblique cutting surfaces. These cuts are called bevel cuts and are required e.g. to weld metal sheets after the cutting. Different angles (10° to 60°) and shapes (V shape, K, shape, Y shape) are produced at the cutting edge here. For this purpose, the plasma cutting torch 2 is inclined at the desired angle in the perpendicular direction to its feed movement direction 10.

A plasma cutting torch 2 should frequently be guided at a feed speed which is as high as possible so that the plasma jet 3 is deflected by the workpiece 4 against the feed movement direction 10 of the plasma cutting torch 2.

The plasma jet 3 "lags". This produces a high productivity and thus a cost reduction. A slightly lagging plasma jet 3 also reduces the burr formation at the lower side of the workpiece 4.

If the feed speed is selected here such that the plasma jet 3 passes almost perpendicular or even in a leading manner through the workpiece 4, burrs are frequently formed at the lower side of the workpiece 4. This burr can usually only be removed with a high effort; it sticks firmly. This particularly occurs with high-alloy steels, but also with low-alloy and non-alloyed steels. The burr is usually a little easier to remove with these.

In FIGS. 7A-7C, the grooves 4.3 are shown which arise on the cutting at the cutting surface 4.2 and which lag due to the deflection of the plasma jet 3. The largest spacing of two points of a cutting groove in the cutting direction is called a groove lag n in accordance with DIN ISO 9013.

FIGS. 8A-8C show photographs of a workpiece 4 made from steel having a thickness 4.3 of 10 mm. FIG. 8A is the view from above of the workpiece 4 and FIG. 8B shows the part view of section H as well as the region Z which projects and which was created on traveling over the workpiece edge 4.4. Grooves of the cutting surface 4.2 as well as the groove lag n=4 mm can furthermore be easily seen. The perspective view of FIG. 8C again illustrates the problem of the projecting region Z.

When traveling over a workpiece edge 4.4 (e.g. cutting edge of a flat joint or the end of a workpiece 4), a region Z is formed which projects with respect to the remaining cutting surface 4.2. The anode starting point of the plasma jet 3 on the workpiece 4 so-to-say "skips" the last piece of the contour in front of the workpiece edge 4.4. In the worst case, a remainder even remains and the workpiece 4 was only incompletely cut.

An attempt has been made to reduce this effect by reducing the cutting speed. However, this does not produce the desired result. If the feed speed is too slow, too much material is removed. In this respect, the plasma jet 3 can "tear off" because its starting point in the workpiece 4 was removed or the cutting edge can wash out.

No feed speed reduction which generates an ideal cutting end at a workpiece edge was able to be determined by trials. Either the last region projected from the cutting surface or too much material was removed.

It is therefore the object of the invention to provide possibilities with which improved cutting surfaces can be achieved in plasma cutting which do not require any reworking, or at least only a reduced reworking. In some embodiments, the problem is solved by inclination or deflection of the plasma jet in the direction of its feed movement direction.

A plasma cutting torch having at least one torch body, an electrode and a nozzle is used. The plasma jet is inclined or deflected at least before the traveling over of a workpiece edge at an angle δ with respect to the axis aligned perpendicular to the workpiece surface such that the emission position of the plasma jet from the workpiece is arranged at a spacing in the feed movement direction which is at most half the amount than is the case with a plasma jet incident perpendicular on the workpiece surface.

The emission position from the workpiece in the feed movement direction can, however, also at least lie in the axis at which the position of incidence of the plasma jet on the workpiece surface is arranged. It can particularly preferably be arranged upstream thereof in the axial feed direction. It can be observed in this respect whether the position of incidence of the plasma jet on the workpiece surface is varied or not with respect to a plasma jet directed perpendicular to the workpiece surface by the inclination or deflection by the inclination or deflection of the plasma jet. With the same position of incidence, the already mentioned spacing, which is half the size, can already be sufficient to be able to achieve the desired effect.

The inclination or deflection should be maintained until the cut has taken place completely, a corner or a radius has been formed. In regions in which a straight-line cut or a cut contour having larger radii is formed, the plasma jet should be aligned completely perpendicular to the workpiece surface, which applies to all axes, that is takes account both of the axis aligned parallel to the feed movement direction and axes aligned at an angle thereto, and a perpendicular angle is also observed there.

On the deflection or inclination of the plasma jet with respect to the workpiece surface, an angle $\delta$ of at least 5° to a maximum of 45°, preferably of at least 15°, should be observed in the feed movement direction of the plasma cutting torch.

The inclination or deflection of the plasma jet should be carried out before the traveling over of a workpiece edge or optionally also the formation of a corner or of a radius of a cutting contour. This should preferably be carried out at the latest, however, when the entry position of the plasma jet into the workpiece surface has reached the position at which the spacing from the workpiece edge, from the corner or from the radius, does not correspond to more than 25% of the dimension of the workpiece thickness 4.3.

The deflection or inclination of the plasma jet can be carried out on the cutting of contours at the earliest during or after the last change in the feed movement direction, in particular after formation of a corner or formation of a radius. Non-critical, substantially straight-line regions or slightly curved regions of a cutting contour can thereby be cut in a conventional manner.

There is also the possibility of maintaining the deflection or inclination of the plasma jet at least up to the passing through of the workpiece edge. On traveling over a kerf or a flat joint, the inclination or deflection should preferably be maintained until the plasma jet has at the earliest reached a position in which the plasma jet contacts the workpiece and this position has a spacing from the workpiece edge which corresponds to 25% of the workpiece thickness or up to which the cutting arc has been extinguished. An extinguishing of the plasma jet typically takes place after the plasma jet has reached a workpiece edge in the cutting and the arc formed between the torch and the workpiece has then been extinguished.

The plasma jet can be inclined or deflected by at least half the dimension of the largest spacing n of two points of a groove b (groove lag) in the feed movement direction, preferably by the measure of the largest spacing n of two points of a groove b (groove lag). In this respect, the spacing is the spacing between the positions of the plasma jet on the incidence onto the workpiece surface with the longitudinal axis of the plasma cutting torch aligned perpendicular to the workpiece surface and the longitudinal axis of the plasma cutting torch aligned at an inclination or with a deflected plasma jet when the tip of the torch (end face of the bore of the nozzle) would be arranged at correspondingly the same position.

It can, however, also be the spacing of the tip of the torch parallel to the workpiece surface which is produced by the inclination or deflection of the plasma jet.

The inclination of the plasma jet during the carrying out of the method in accordance with the invention in the mentioned critical regions can be achieved by inclination of the longitudinal axis of the nozzle bore and/or of the nozzle of the plasma torch. The inclination should preferably be achieved by a pivoting of the total plasma cutting torch.

The inclination of the plasma cutting torch should be carried out about a position of the plasma jet between the tip of the plasma cutting torch and the position at which it is incident onto the surface of the workpiece.

The inclination of the plasma cutting torch can also be carried out about the position at which the plasma jet is incident onto the surface of the workpiece.

An inclination of the plasma jet is also achievable by a displacement of the nozzle and/or of the nozzle bore with respect to the electrode and/or to the emission insert of a torch in the feed movement direction of the plasma cutting torch.

A deflection of a plasma jet can take place magnetically. For this purpose, the plasma jet can be deflected into the desired direction by the use of at least one permanent magnet or electromagnet in the critical regions of a flat joint of the plasma jet. The course of the plasma jet in the region of its tip is thereby curved. A permanent magnet or an electromagnet can be moved into the proximity of the plasma jet in the critical regions and a desired deflection can be achieved by means of the field lines.

On a use of one or more electromagnets, this can also be achieved a switching on and a later switching off or by an increase and decrease of the field strength.

In the method in accordance with the invention, a signal that the plasma jet should be inclined or deflected toward the workpiece surface in the feed movement direction of the plasma cutting torch can be provided by a guide system with which the plasma cutting torch is guided and/or its control. Such signals can be transmitted to a mechanical inclination unit, to the plasma cutting torch or to a magnetic deflection device, whereby the inclination or deflection of the plasma jet can be achieved if this is necessary on the cutting in critical regions. For this purpose, data of the control for the respective workpiece to be cut out with its contour to be cut can also be taken into account. This also applies to the addressed critical contour regions.

A control of the guide system or of the plasma cutting system can be used which has a database in which at least for one material type and/or for one electrical cutting current, data on the degree and/or the time of the deflection or inclination of the plasma jet are stored.

The material type, the workpiece thickness, the electrical cutting current at which the plasma jet is operated and the feed speed before the cutting can be stored in such a database.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The invention will be explained in more detail by way of example in the following.

FIG. 3 shows a cut workpiece.

FIG. 4A shows a contour of a cut workpiece.

FIG. 4B shows a zoomed in perspective view of part of FIG. 4A.

FIG. 5A shows a cut workpiece having a straight-line cut.

FIG. 5B shows a zoomed in perspective view of part of FIG. 5A.

FIG. 6 shows an arrangement of a plasma cutting torch with a workpiece.

FIG. 7A shows the groove lag in accordance with DIN ISO 9013.

FIG. 7B shows the groove lag in accordance with DIN ISO 9013.

FIG. 7C shows the groove lag in accordance with DIN ISO 9013.

FIG. 8C is a photo as a part view of a cut workpiece;

FIG. 9 shows an arrangement of a plasma cutting torch with a workpiece in which arrangement a plasma jet can be inclined.

Figure 1:
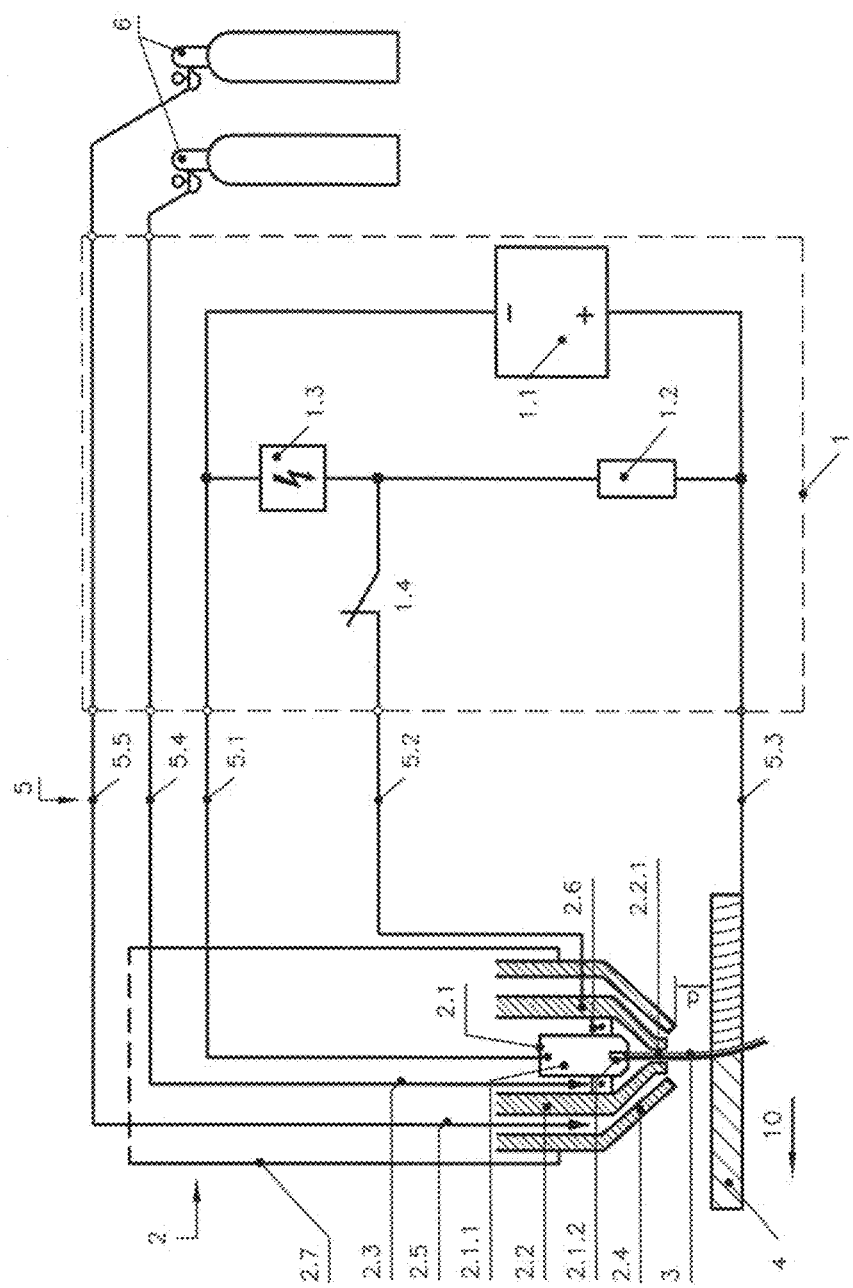
FIG. 1 shows an arrangement for the plasma cutting according to the prior art.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 9. shows an example. The plasma cutting torch 2 is here inclined by way of example from the perpendicular alignment (α=90°) with respect to the workpiece surface in the cutting by the angle δ, e.g. 20°, to the workpiece surface with the plasma torch tip in the cutting direction 10 before the traveling over of the workpiece edge 4.4. A value of 70° thus results in this example for the angle β. The alignment of the plasma cutting torch 2 with the plasma torch tip in the feed direction 10 is also called stabbing guidance. A straight cutting off of the workpiece 4 to be cut is achieved by the stabbing guidance of the plasma cutting torch 2. The anode starting point on the workpiece 4 does not "skip" the last piece of the contour to be cut. The creation of the region Z projecting from the cutting surface 4.2 is thus prevented.

Figure 10:
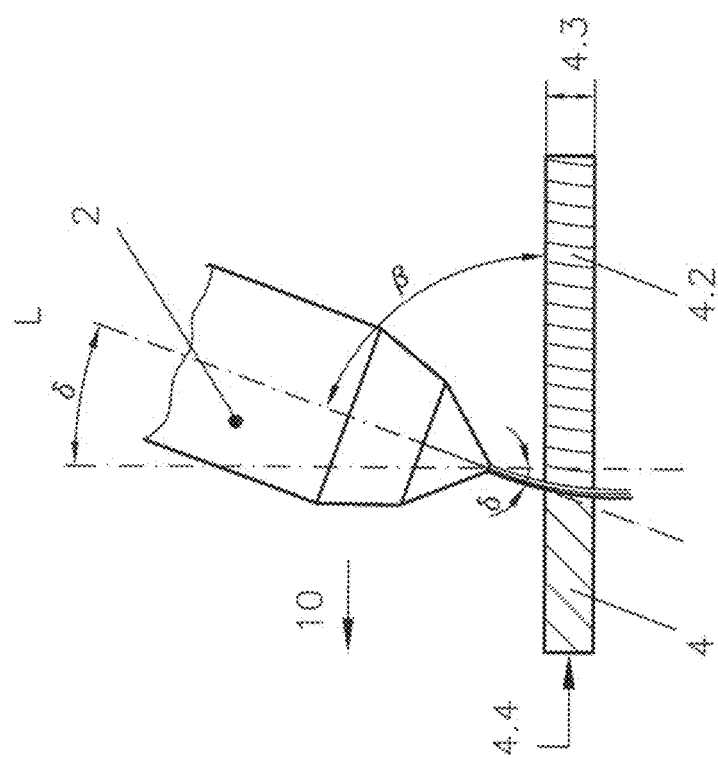
FIG. 10 show an arrangement of a plasma cutting torch with a workpiece.

FIG. 10 likewise shows a plasma cutting torch 2 which is guided in a stabbing manner. The position 3.1 at which the plasma jet 3 is incident onto the workpiece surface is located behind the position 3.2 in the feed direction 10 at which the plasma jet 3 is emitted from the lower side of the workpiece. This is particularly advantageous when the workpiece 4 to be cut is to be cut off reliably since it is thus ensured that the anode starting point of the plasma jet 3 remains on the part to be cut up to the traveling over of the workpiece edge 4.4.

Figure 2:
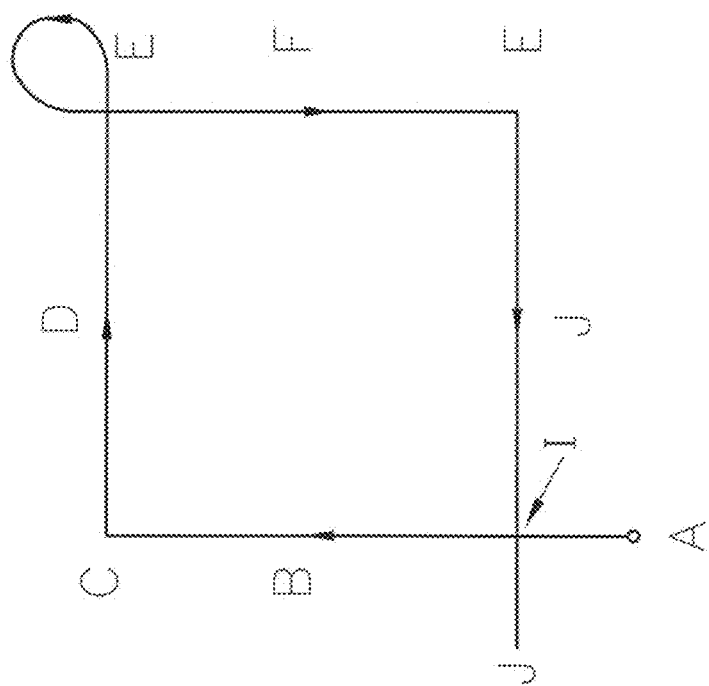
FIG. 2 shows a contour guiding of a plasma cutting torch.
Figure 8A:
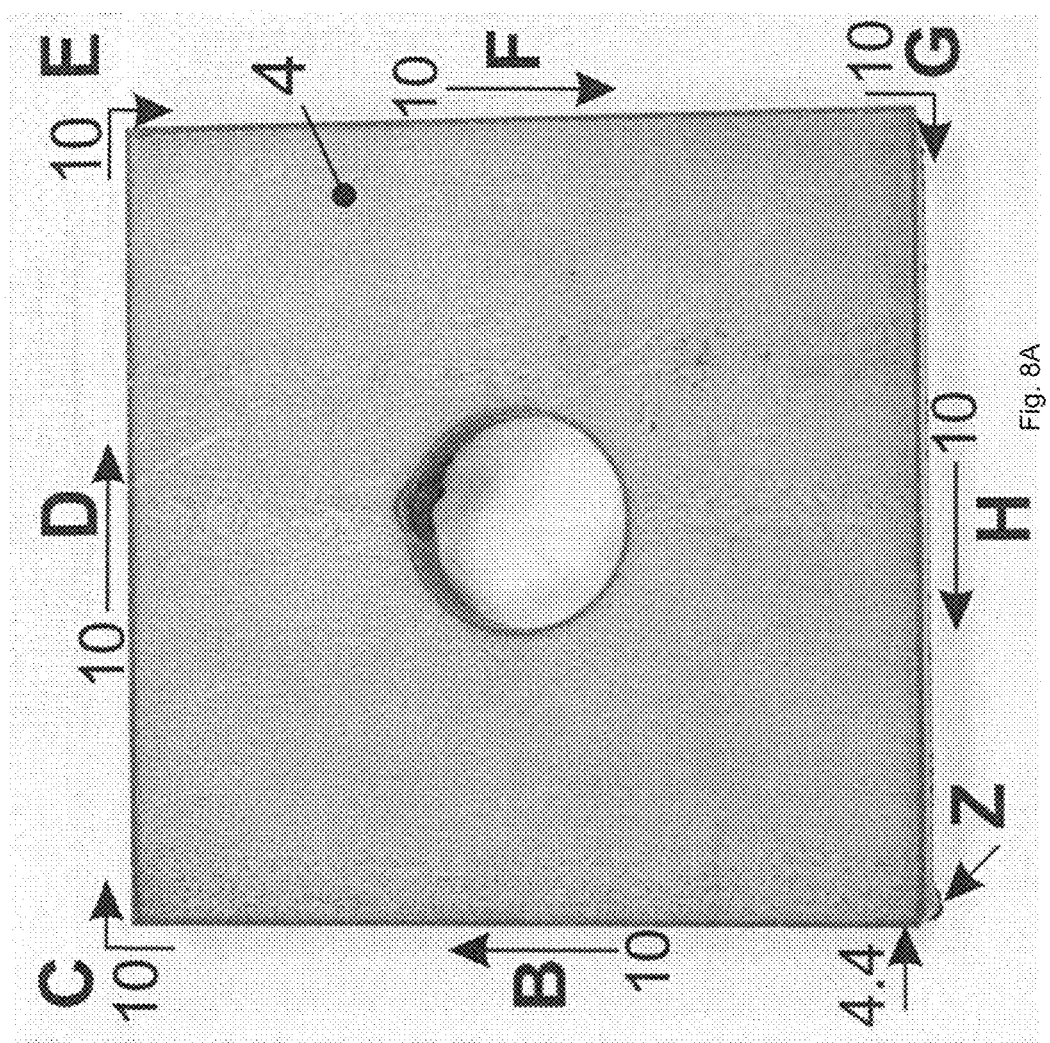
FIG. 8A is a photo as a view of a cut workpiece from above.
Figure 8B:
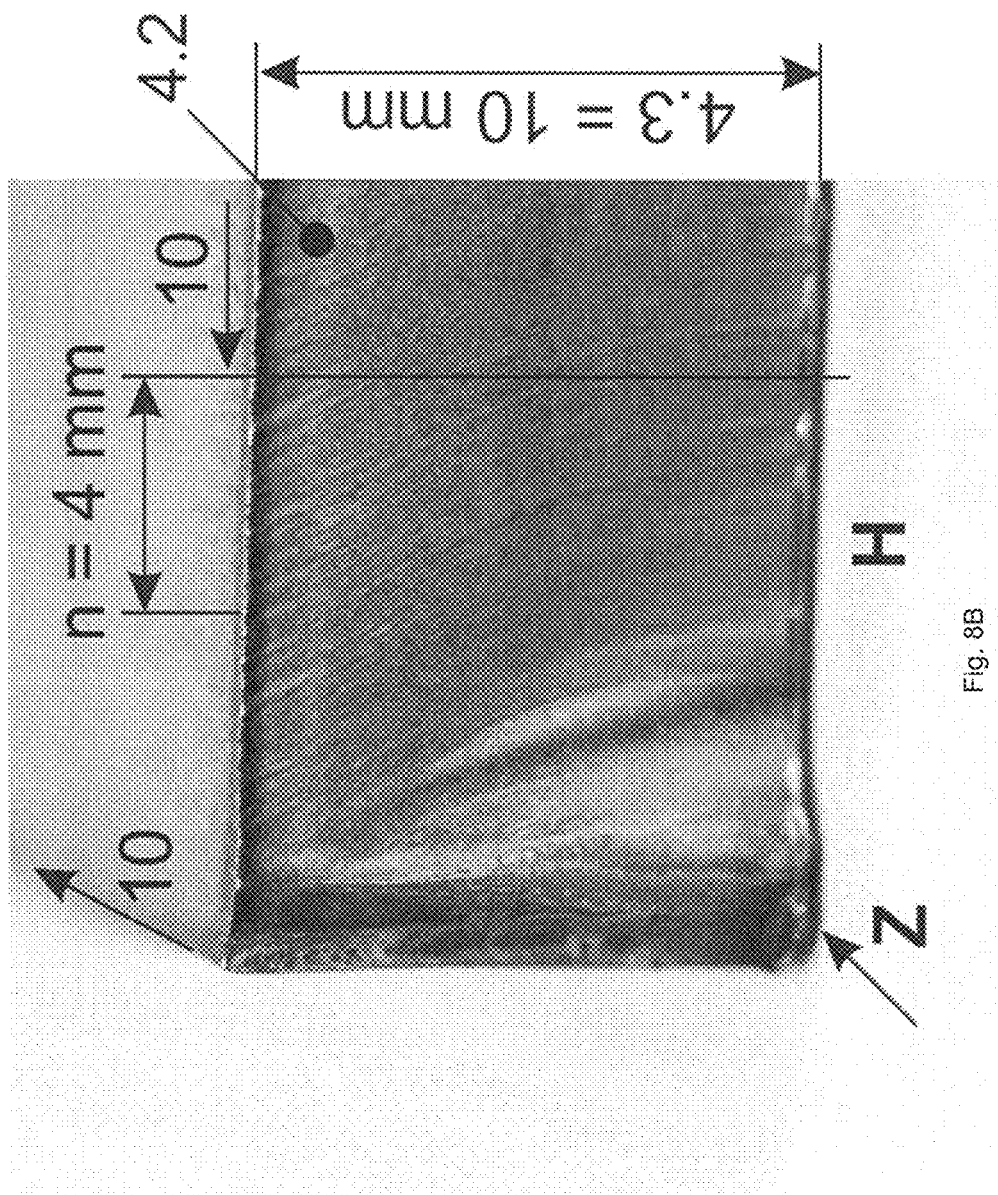
FIG. 8B is a photo as a part view of a cut workpiece.

It is sensible under certain circumstances to maintain the inclination of the plasma cutting torch 2 up to the repeat stabbing (FIG. 2, section A) for cutting the next workpiece 4 so that the upwardly splashing material of the workpiece 4 melted on the stabbing does not splash against the tip of the plasma cutting torch 2, e.g. the nozzle 2.2 or the secondary cap 2.4, and damages it. The plasma cutting torch 2 is aligned perpendicular to the workpiece surface or as is required for cutting at the latest when it again reaches the contour of the workpiece 4 to be cut (e.g. FIG. 2, section B, at the latest at the position I).

The deflection of the plasma jet 3 can also take place magnetically by a suitable arrangement.

The displacement of the nozzle 2.2. is equally possible in the feed direction 10 with respect to the electrode 2.1.

With a curve-shaped feed movement direction, the plasma jet 3 is inclined or deflected tangentially to the feed movement direction 10, with it being able to be tangentially tracked to the feed movement direction 10.

To realize a deflection or alignment of the plasma jet 3 which is as simple as possible, the cut ends of the parts of a workpiece 4 to be cut can always lie in the same feed movement direction 10. The deflection of the plasma jet 3 before the workpiece edge 4.4 must thus only take place in one direction. This substantially reduces the control effort.

REFERENCE NUMERAL LIST 1.1 electrical current source
1.2 electrical resistance
1.3 high-voltage ignition unit
1.4 switch contact
2 plasma cutting torch
2.1 electrode
2.1.1 electrode holder
2.1.2 emission insert
2.2 nozzle
2.2.1 nozzle bore
2.3 gas supply
2.4 secondary gas cap
2.5 secondary gas supply
2.6 gas guide, plasma gas
2.7 torch body
3 plasma jet
4 workpiece
4.1 flat joint
4.2 cut surface
4.3 workpiece thickness
4.4 workpiece edge
5 connection lines and connection hoses
5.1 connection line, plasma cutting system—electrode for cutting current
5.2 connection line, plasma cutting system—nozzle for pilot current
5.3 connection line, plasma cutting system—workpiece for cutting current
5.4 gas hose for plasma gas
5.5 gas hose for secondary gas
6 gas supply
10 feed movement direction of the plasma cutting torch, cutting direction
A section A stabbing
B section B straight line
C section C corner
D section D straight line
E section E corner
F section F straight line
G section G corner
H section H straight line
I section I, passing through the workpiece edge
J section J, cut end
b groove
d spacing plasma cutting torch—workpiece
n largest spacing of two points of a cut groove in the cutting direction, groove lag α angle between the longitudinal axis L of the plasma torch and the workpiece surface on cutting δ angle between the longitudinal axis of the plasma cutting torch and the workpiece surface before and during the traveling over of the cut edge Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A method for plasma cutting a workpiece using a plasma cutting torch having at least a torch body, an electrode and a nozzle, the workpiece having an upper surface facing the plasma cutting torch and a lower surface with a thickness defined between the upper surface and the lower surface, and the workpiece having a free edge that extends from the upper surface to the lower surface, the plasma cutting torch emitting a plasma jet that provides a cut through the workpiece and is movable in a feed movement direction from a position of incidence of the plasma jet onto the upper surface of the workpiece to the free edge of the workpiece, said plasma jet exiting from the lower surface of the workpiece at an emission position, wherein as the plasma cutting torch is moved toward the workpiece free edge, the emission position lags from the position of incidence on the upper surface to the emission position on the lower surface, such that when the plasma jet is incident perpendicular to the upper surface of the workpiece, the lag from the position of incidence to the emission position defines a first distance, wherein the method comprises:

inclining or deflecting the plasma jet in the feed movement direction at an angle δ with respect to an axis aligned perpendicular to the upper surface of the workpiece, said angle δ being between at least 5° and a maximum of 45° from said axis aligned perpendicular to the upper surface of the workpiece as observed in the feed movement direction, such that the emission position of the plasma jet from the lower surface of the workpiece is spaced in the feed movement direction from the position of incidence, the spacing defining a second distance which is at most half the first distance, said inclining or deflecting of the plasma jet occurring no later than when the position of incidence of the plasma jet on the upper surface of the workpiece has reached a spacing from the free edge of the workpiece on the upper surface that corresponds to 25% of a dimension of the workpiece thickness.

2. The method of claim 1, wherein the plasma jet is inclined or deflected such that the plasma jet emission position from the workpiece in the feed movement direction is at least at the axis at which the position of incidence of the plasma jet on the upper surface of the workpiece is arranged.

3. The method of claim 1, wherein the plasma jet is inclined or deflected such that the plasma jet emission position from the workpiece in the feed movement direction is upstream of said axis.

4. The method of claim 1, wherein the plasma jet is inclined or deflected in cutting contours, at the earliest, during or after the last change in the feed movement direction, in particular after formation of a corner or formation of a radius.

5. The method of claim 1, wherein the plasma jet is deflected or inclined at least until passing through of the workpiece free edge and traveling over a kerf.

6. The method of claim 1, wherein the plasma jet is extinguished after the plasma jet reaches the workpiece free edge.

7. The method of claim 1, wherein the plasma jet is inclined or deflected by at least half a dimension of the largest spacing n of two points of a groove b (groove lag) in the feed movement direction.

8. The method of claim 1, wherein the plasma jet is inclined or deflected by at least the measure of a largest spacing n of two points of a groove b (groove lag).

9. The method of claim 1, wherein inclining the plasma jet comprises inclination of a longitudinal axis of the nozzle bore, or inclination of the nozzle of the plasma cutting torch, or inclination of the plasma cutting torch.

10. The method of claim 1, wherein inclining the plasma cutting torch is carried out about stored data regarding a point of the plasma jet between a tip of the plasma cutting torch and the position at which the plasma jet is incident on the surface of the workpiece.

11. The method of claim 1, wherein inclining the plasma cutting torch is carried out about the position/the point at which the plasma jet is incident on the upper surface of the workpiece.

12. The method of claim 1, wherein inclining the plasma jet comprises displacing the nozzle and/or a nozzle bore with respect to the electrode and/or with respect to an emission insert in the feed movement direction of the plasma cutting torch.

13. The method of claim 1, wherein deflecting the plasma jet comprises magnetic deflection of the plasma jet.

14. The method of claim 1, wherein a guide system with which the plasma cutting torch is guided and/or whose control is provided and transmitted to a mechanical inclination unit, provides a signal to the plasma cutting torch or to a mechanical deflection device that the plasma jet is to be inclined or deflected in the feed movement direction of the plasma cutting torch toward the upper surface of the workpiece.

15. The method of claim 14, wherein a control of the guide system is used which has a database in which a degree and/or a time of the deflection or inclination of the plasma jet is stored at least for one material type and/or for one electrical cutting current.

16. The method of claim 15, wherein a material type, a workpiece thickness, an electrical cutting current at which the plasma jet is operated and a feed speed before a cutting data are stored in the database.

* * * * *